US005177477A

United States Patent [19]

Fennell et al.

[11] Patent Number: 5,177,477

[45] Date of Patent: Jan. 5, 1993

[54] SELECTIVE CALL RECEIVER HAVING A FILE FOR RETAINING MULTIPLE MESSAGES

[75] Inventors: Robert D. Fennell, Coral Springs; Mark T. Stair, Delray Beach, both of Fla.

[73] Assignee: Motorola, Inc., Schaumburg, Ill.

[21] Appl. No.: 587,497

[22] Filed: Sep. 24, 1990

Related U.S. Application Data

[63] Continuation of Ser. No. 393,606, Aug. 14, 1989, abandoned.

[51] Int. Cl.[5] .............. H04Q 7/00

[52] U.S. Cl. .............. 340/825.44; 340/825.47

[58] Field of Search .............. 340/825.44, 825.45, 340/825.46, 825.47, 825.48, 311.1, 825.69; 370/94.1; 455/38, 38.1; 379/57, 59

[56] References Cited

U.S. PATENT DOCUMENTS 4,336,524 6/1982 Levine .............. 340/825.44
4,385,295 5/1983 Willard et al. .............. 340/825.44
4,477,808 10/1984 Ichikawa .............. 340/825.44
4,713,808 12/1987 Gaskill et al. .............. 370/94.1
4,786,901 11/1988 Matai et al. .............. 340/825.44
4,812,813 3/1989 Ide et al. .............. 340/311.1
5,075,684 12/1991 DeLuca .

FOREIGN PATENT DOCUMENTS 2915708 10/1980 Fed. Rep. of Germany .............. 340/825.44

*Primary Examiner*—Donald J. Yusko
*Assistant Examiner*—Peter S. Weissman
*Attorney, Agent, or Firm*—William E. Koch; Thomas G. Berry

[57] ABSTRACT

A method of storing received messages in a selective call receiver comprising the steps of transferring the address of a previously received message from one of a predetermined number of slots, and storing a new message address in the predetermined slot. The previously received message address is transferred automatically into a history file when the slots are occupied and a new message is received, or the previously received message address may be transferred manually into a personal file for retention of important information.

13 Claims, 3 Drawing Sheets

2/3

SELECTIVE CALL RECEIVER HAVING A FILE FOR RETAINING MULTIPLE MESSAGES

This is a continuation of application Ser. No. 07/393,606, filed Aug. 14, 1989 and now abandoned.

FIELD OF THE INVENTION

This invention relates in general to selective call receivers and more particularly to a method of storing messages in a selective call receiver.

BACKGROUND OF THE INVENTION

Selective call radio receivers such as pagers are used to alert a user of a message. Such devices generally incorporate a radio receiver capable of producing either an audible alerting signal which may be heard by the user or a vibrating sensation which may be felt by the user. Some pagers provide the additional features of a voice message following the audible alert or a message visually displayed on a screen.

Each selective call receiver is identified by a specific receiver address that typically precedes each message. When a selected selective call receiver receives a message, the message is stored within memory, and a message address identifying where that message is stored is placed in one of a plurality of slots within memory. Each slot is a designated area of memory for receiving one message address and each selective call receiver typically has a predetermined number of slots.

However, when the slots are already occupied and another message is received, typically the earliest message and its message address are deleted and the newly received message is stored and its message address is placed in that slot. This is undesirable since the user of the selective call receiver may not have read the deleted message or the message may contain information that the user will require at a later time.

Thus, what is needed is a method of storing messages in a selective call receiver comprising the steps of transferring the message address of a previously received message from one of a predetermined number of slots into a file, and storing a new message and its message address in one of the slots.

SUMMARY OF THE INVENTION

Accordingly, it is an object of the present invention to provide an improved selective call receiver.

Another object of the present invention is to provide a method for storing messages in a selective call receiver when the designated slots for storing the messages are already occupied.

Still another object of the present invention is to provide a method for storing messages in a selective call receiver when the user desires to retain the information within a designated message.

In carrying out the above and other objects of the invention in one form, there is provided a method of storing received messages in a selective call receiver comprising the steps of storing each of the received messages, each of the messages having a unique address within one of a predetermined number of address slots; placing one of the addresses from one of the address slots into a file; and placing an address of a newly received message into one of the address slots.

The above and other objects, features, and advantages of the present invention will be better understood from the following detailed description taken in conjunction with the accompanying drawings.

DETAILED DESCRIPTION OF THE INVENTION

Figure 1:
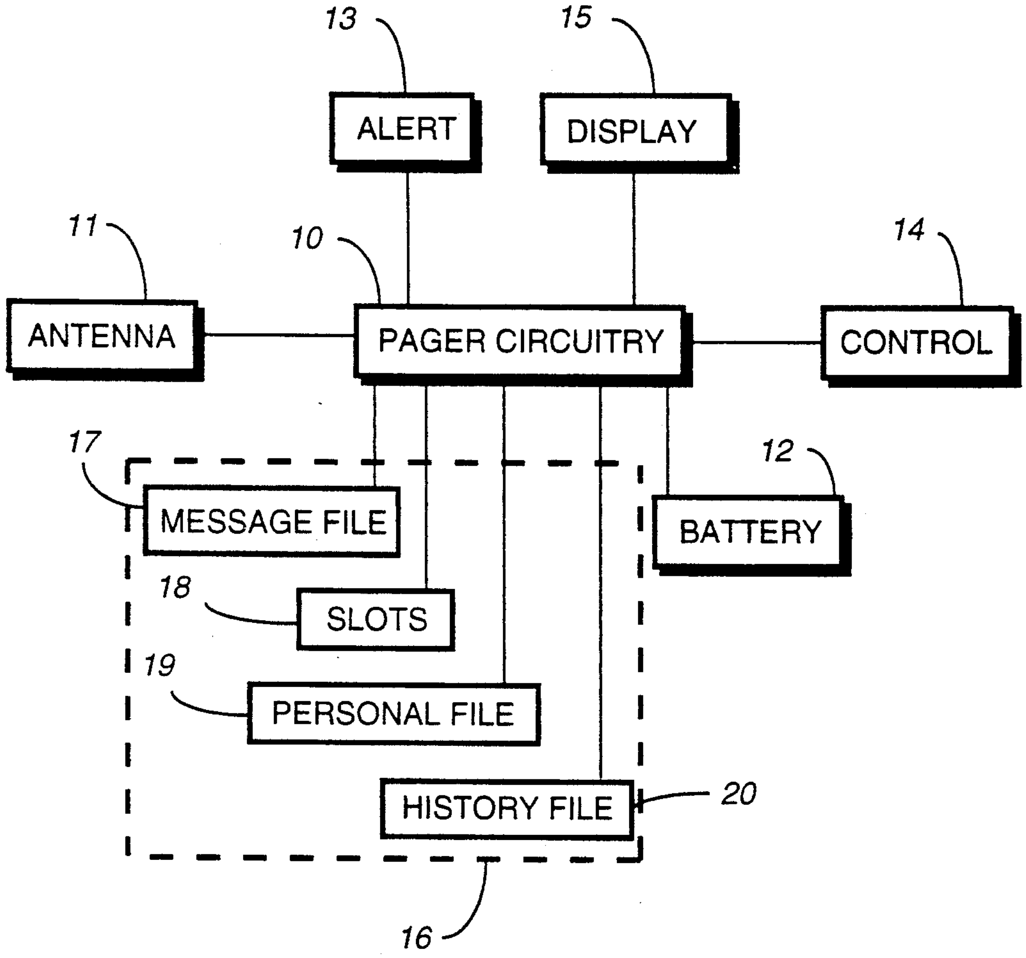
FIG. 1 is a block diagram of a selective call receiver in accordance with the preferred embodiment of the present invention.

Referring to FIG. 1, a block diagram of the preferred embodiment of a pager comprises a pager circuitry 10 coupled to each of an antenna 11, a battery 12, an alert apparatus 13, and a control apparatus 14 such as on/off, volume control, and display control switches for performing the pager operation well known to those skilled in the art. A display apparatus 15 may be included in the pager for visually displaying an alert or a message. The pager circuitry 10 receives a message by antenna 11 and alerts the user of its receipt by an audio tone or a silent vibration for example. The message may be displayed automatically or may be selected for display manually by operation of the control 14.

A memory 16 includes a received message file 17 for storing a predetermined number of the received messages as they are received and a plurality of slots 18 for storing the address of each message located in the file 17. Typically, the messages are stored in a first-in first-out (FIFO) manner wherein a newly received message is written over the oldest received message when the predetermined number of messages is reached. In accordance with the present invention, the memory further includes a personal file 19 and a history file 20 which, for example, comprises random access memory (RAM) for receiving and storing the message addresses from the slots 18 in a manner to be described hereinafter.

Figure 2A:
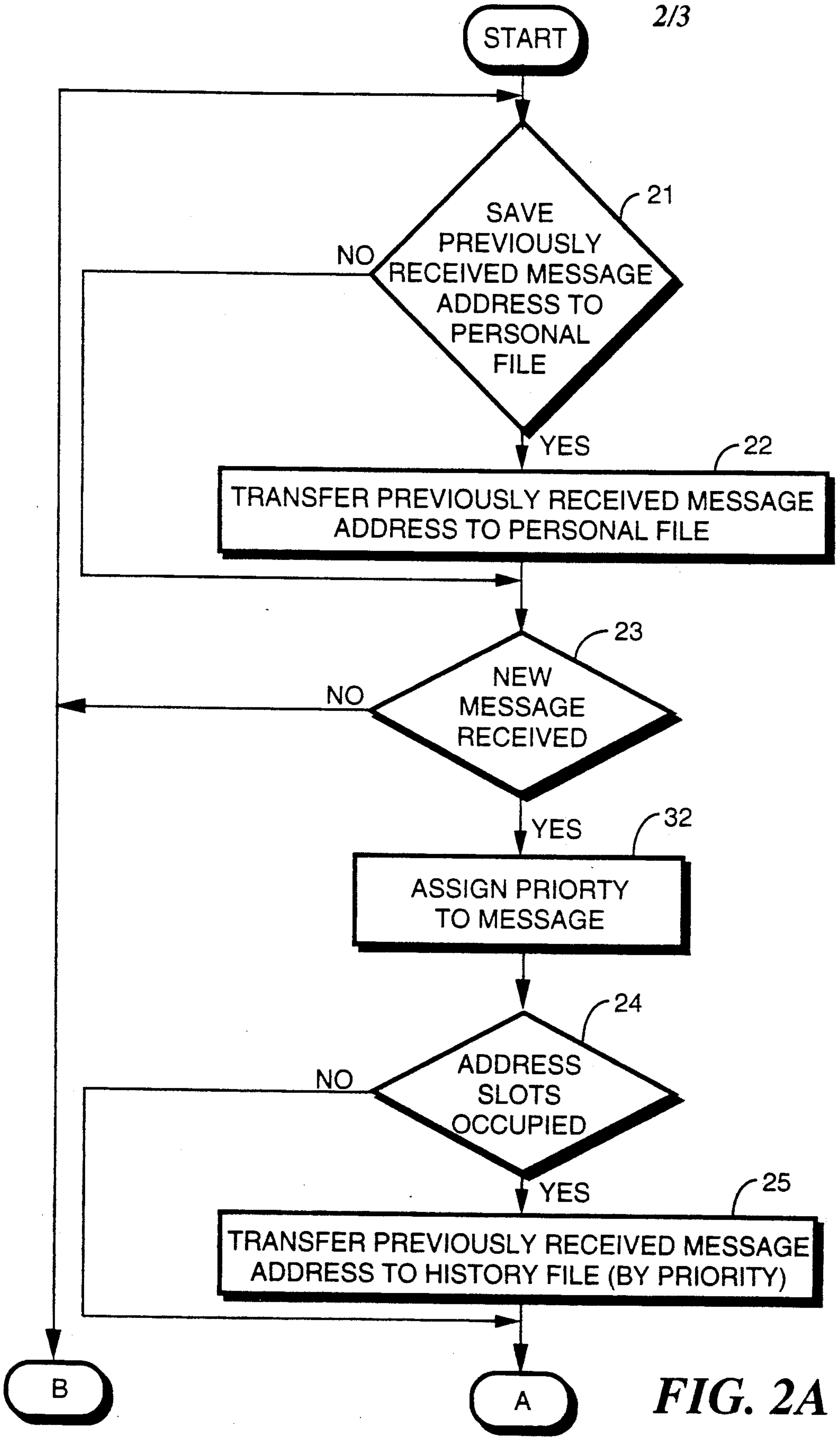
FIGS. 2A and 2B are a flow chart of the method of the preferred embodiment.
Figure 2B:
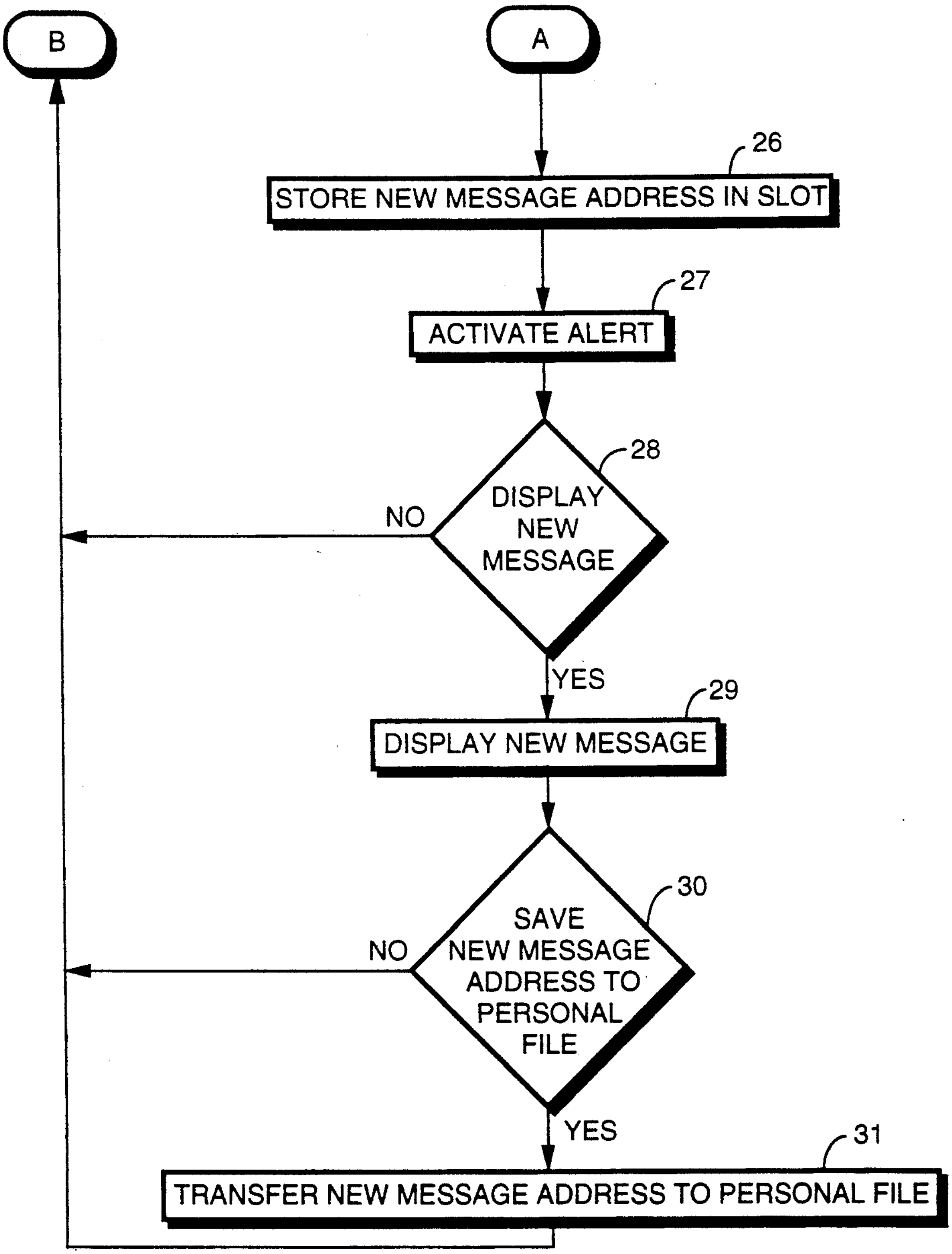

Referring to FIGS. 2A and 2B, the selective call receiver usually remains in a static, low power state awaiting receipt of a message as shown in steps 21 and 23. During this period, the user of the selective call receiver may decide to save a previously received message 21 and transfer the address of that message to the personal file 22. For example, a previously received message may contain information that needed to be retained and the user did not desire to have the message (address) deleted by a newly received message. If a message address was not to be transferred 21, and if a new message was not received 23, the pager would remain in the static, low power loop.

If a new message is received 23 and an address slot is available 24, then the newly received message address would be stored in the next available empty slot 26. However, if the slots are fully occupied by previously received message addresses 24, a previously received message address is transferred to the history file before the newly received message address is written in that slot. In the preferred embodiment, the oldest received message address would be transferred in the FIFO manner. In another embodiment, the previously received messages could by identified be a priority code in which the messages with the lowest priority code would have their addresses transferred and the newly received message address placed in that slot. Additional embodiments would include several other methods of identifying which message address in a particular slot would be transferred.

Once the newly received message address has been stored 26 in a slot from which a previously received message address has been transferred 25, the user is alerted 27 in a manner known to those skilled in the art, and if the selective call receiver is so equiped and the user desires 28, the message may be displayed 29.

In summary, if the slots of message file 17 are fully occupied, the message address in one of the slots will be transferred to the history file 28 prior to a newly received message address being placed in the slot. Additionally, the user may select a message address for storage in the personal file 19 for retaining important messages.

By now it should be appreciated that there has been provided a method of storing received messages in a selective call receiver comprising the steps of transferring a previously received message from one of a predetermined number of slots within a first memory, and storing a new message in the predetermined slot.

We claim:

1. A method of storing received messages in a selective call receiver comprising the steps of:

(a) storing each of the received messages, each of the messages having a unique address which is stored within one of a plurality of address slots when received, each of the address slots capable of storing only one address;

(b) placing one of the addresses from one of the address slots into a concatenated slot when the address slots are occupied and in response to an additional message being received, the concatenated slot capable of storing a plurality of addresses; and (c) placing an address of the additional message into one of the address slots subsequent to step (b).

2. The method according to claim 1 wherein step (b) places the address into a history file.

3. The method according to claim 1 wherein step (b) is preceded by the step of manually selecting one of the previously received messages to be transferred.

4. The method according to claim 3 wherein step (b) places the address into a personal file.

5. The method according to claim 1 wherein the address slots define a queue of messages in a predetermined order, step (c) comprising the steps of:

moving the addresses within the address slots; and placing the address of the newly received message into the address slot at the end of the queue of the address slots.

6. A method of storing received messages in a selective call receiver comprising the steps of:

receiving a new message;

determining a message address for the received message;

storing the message address within one of a plurality of address slots, each of the address slots capable of storing only one address;

determining, in response to the receipt of the new message, whether the plurality of address slots are occupied by addresses of previously received messages;

placing a previously received address from one of the address slots in a concatenated slot if the address slots are occupied, the concatenated slot capable of storing a plurality of addresses; and storing the address of the new message in one of the address slots subsequent to the address from one of the address slots being placed in the concatenated slot.

7. The method according to claim 6 wherein the address slots define a queue of messages in a predetermined order, the storing step comprising the steps of:

moving the addresses within the address slots; and placing the address of the newly received message into the address slot at the end of the queue of the address slots.

8. A selective call receiver comprising:

first means for receiving a plurality of messages;

second means coupled to said first means for storing the messages, each message having an address corresponding thereto stored within one of a plurality of slots when received, each of the slots capable of storing only one address;

third means coupled to said first means for storing in a concatenated slot, one of the addresses from one of the slots, when the slots are full and prior to another message being stored and having its address corresponding thereto stored in one of the slots, the concatenated slot capable of storing a plurality of addresses;

fourth means coupled to said first means for providing an alert when one of the messages has been received; and fifth means coupled to said first means for presenting one of the messages as an output.

9. The selective call receiver according to claim 8 wherein said third means comprises a history file wherein the address is transferred in response to the receipt of another message.

10. The selective call receiver according to claim 8 wherein said third means comprises a personal file wherein the address is transferred manually.

11. The selective call receiver according to claim 8 wherein the slots define a queue of messages in a predetermined order, said third means comprising:

sixth means for moving the addresses within the first slots; and seventh means for placing the address of the newly received message into the slot at the end of the queue of the slots.

12. A method of storing received messages in a selective call receiver comprising the steps of:

(a) storing each of the received messages, each of the messages having a unique address which is stored within one of a plurality of address slots when received, each of the slots capable of storing only one address;

(b) selectively identifying addresses as having a first priority;

(c) placing one of the identified addresses from one of the address slots into a concatenated slot when the address slots are occupied and in response to an additional message being received, the concatenated slot capable of storing a plurality of addresses; and (d) placing an address of the additional message into one of the address slots subsequent to step (c).

13. The method according to claim 12 further comprising the step of (e) placing one of the non-identified addresses from one of the address slots into a second concatenated slot when the address slots are occupied and in response to another additional message being received.

* * * * *